Sept. 9, 1969   W. C. SIZER   3,465,919
DEVICE FOR STORING AND DISPENSING HOT FOOD
Filed Aug. 30, 1967   2 Sheets-Sheet 1
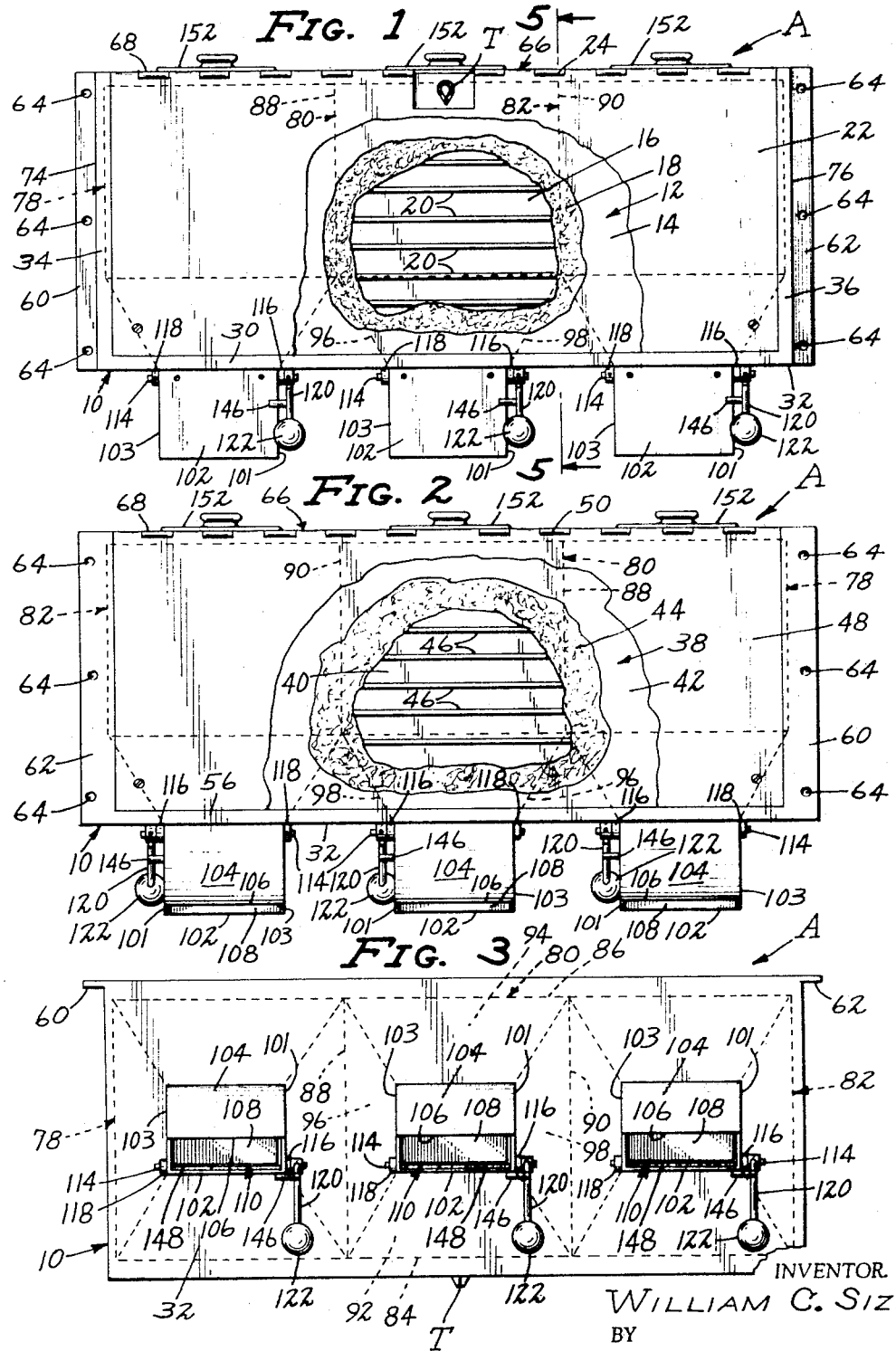
INVENTOR.
WILLIAM C. SIZER
BY
Carlsen, Carlsen, Sturm & Nicks
ATTORNEYS

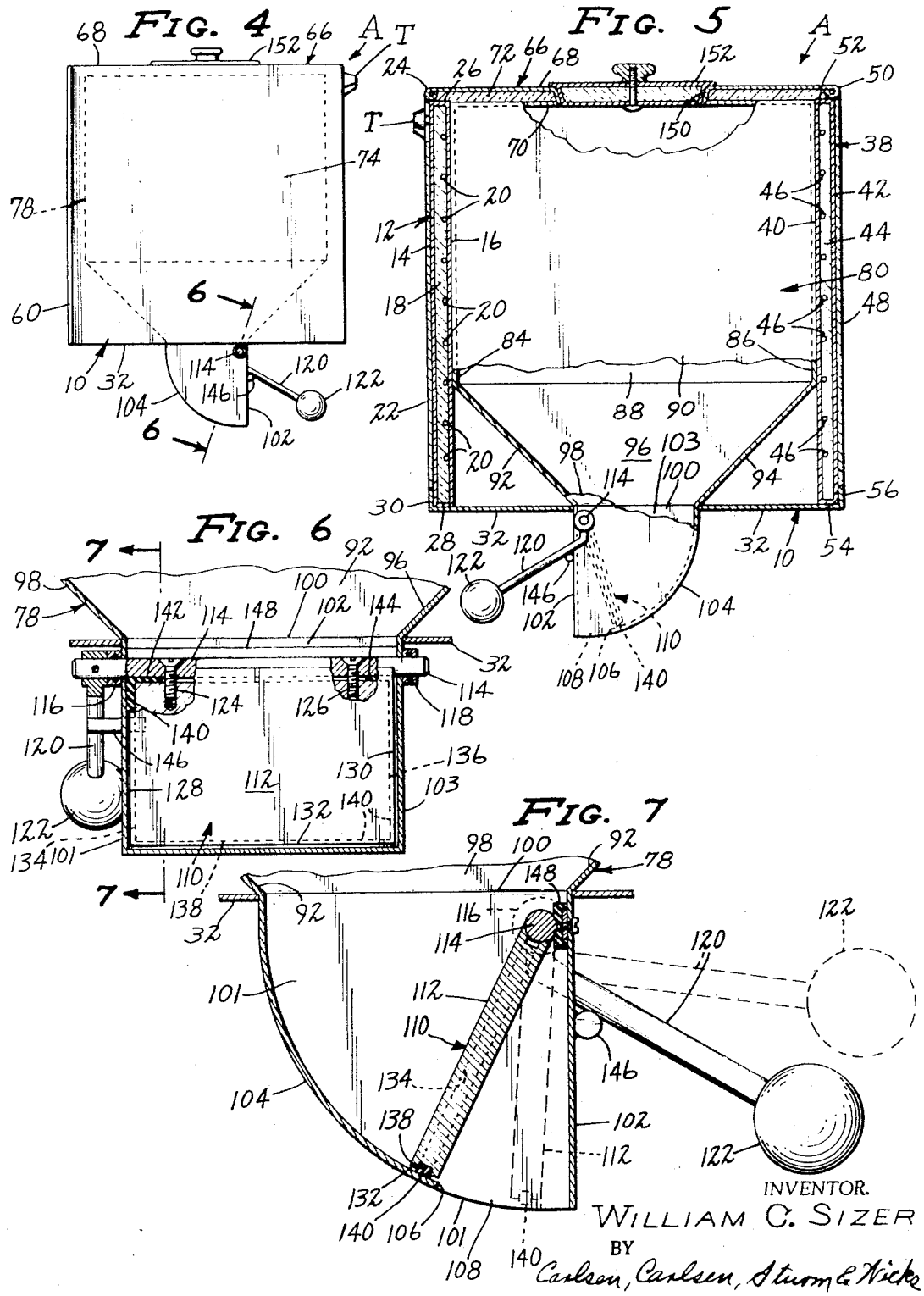

United States Patent Office 3,465,919
Patented Sept. 9, 1969

3,465,919
DEVICE FOR STORING AND DISPENSING HOT FOOD
William C. Sizer, Milwaukee, Wis.
(Box 832, Minneapolis, Minn. 55440)
Filed Aug. 30, 1967, Ser. No. 664,417
Int. Cl. B65d 47/00; B67d 5/62
U.S. Cl. 222—146                    2 Claims

ABSTRACT OF THE DISCLOSURE

The disclosure includes a housing for the storage and dispensing of hot food, the housing including separate insulated compartments each having a hopper bottom and a wide mouthed tap valve at the lower end of the hopper for dispensing of desired amounts of the food. The compartments are heated whereby the food is kept warm. The housing is provided with front and rear removable plate portions for replacement of parts if necessary. Each compartment is provided with a cover for filling and cleaning the compartment.

---

The invention relates to an improvement in devices for storing and dispensing food and more particularly to a device for storing and dispensing hot foods. It is an object of the invention to provide a housing having insulated walls in which heating elements are embedded, and a further object is to provide in the housing separate insulated compartments each having a hopper bottom and a wide mouthed tap valve at the lower end of the hopper for dispensing desired amounts of the food. The compartments and tap valves are of a construction whereby the same allow easy escape of food and easy positive cleaning. Food may be kept warm and dispensed when needed, particularly desirable for leftover foods. Food is placed in the compartments after the same is taken from the original container. This obviates the necessity of storing foods in other containers in different places.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIG. 1 is a front elevational view of the device embodying the invention portions of which are broken away.

FIG. 2 is a rear elevational view of the device.

FIG. 3 is a bottom plan view thereof.

FIG. 4 is an end view.

FIG. 5 is a transverse section of the device.

FIG. 6 is a longitudinal section on the line 6—6 of FIG. 4.

FIG. 7 is a transverse section on the line 7—7 of FIG. 6.

Referring to the drawings in detail, the food storage and dispensing device A includes the housing 10 including the front wall 12 made up of the front plate portion 14 and the spaced rear plate portion 16. The space between the front and rear plate portions is filled with the insulative material 18, and positioned within the insulative material are the heating element wires 20. Further provided as part of the front wall 12 is the front access door 22 which is hingedly mounted along the top edge thereof by means of the hinge 24 connected to the top edge member 26 of the wall. Also provided is the lower edge wall member 28.

The numeral 30 designates a lower partial front wall portion abutting the lower edge of the access door 22 and secured to the housing bottom 32. The numerals 34 and 36 designate partial end wall portions connected to the outer ends of the lower wall portion 30 and abutting the end edges of the access door 22.

Further provided is the rear wall 38 made up of the front plate portion 40 and the spaced rear plate portion 42. The space between front and rear plate portions 40 and 42 is filled with the insulative material 44, and positioned within the insulative material are the heating element wires 46. Further provided as part of the rear wall is the rear access door 48 which is hingedly mounted along the top edge thereof by means of the hinge 50. The hinge member 50 is connected to the top edge member 52 of the wall 38. Also provided is the lower edge wall member 54.

The numeral 56 designates a lower partial rear wall portion abutting the lower edge of the rear access door 48 and secured to the housing bottom 32. The numerals 60 and 62 designate flanges connected to the outer ends of the lower rear wall portion 56 and abutting the end edges of the rear access door 48. The flanges 60 and 62 are provided with screw holes 64 whereby the unit may be mounted on a wall.

The housing 10 further includes the top 66 which includes the upper wall portion 68 and the lower wall portion 70 spaced therefrom with the space therebetween filled with insulative material 72. The top 66 is secured along its peripheral edges to the front and rear walls and the identical insulated end walls 74 and 76, said end walls being connected to the front and rear walls and the top 66.

Mounted within the housing 10 are three storage compartments 78, 80 and 82. Each compartment is identical, thereforre only compartment 80 will be described in detail.

Compartment 80 includes the upper spaced front and rear spaced walls 84 and 86, respectively, joined at the upper edges thereof to the wall portion 70 part of the top 66. Connected to the walls 84 and 86 are the side walls 88 and 90 which form the upper portion of the hopper. Depending from the lower edges of the walls 84, 86, 88 and 90 are the converging hopper walls 92, 94, 96 and 98, respectively. The lower edges and the converging walls 92, 94, 96 and 98 form a hopper mouth 100. Depending from the lower edges of the converging wall 92 is the short front wall 102, and depending from the lower edge of the converging wall 94 is the arcuate short rear wall 104. The walls 102 and 104 are connected to the side walls 101 and 103. The lower edge 106 of the wall is spaced from the lower edge of the short front wall 102 to form the top opening 108.

Further provided is the flat pivoted valve member 110 which includes the flat body member 112. The numeral 114 designates a shaft mounted for rotation in the bearings 116 and 118 mounted on the walls 101 and 103. Secured to one end of the shaft 114 is the handle 120 which has the weight 122 mounted on the outer end thereof. The valve body member 112 is secured to the shaft 114 by means of the bolts 124 and 126. The end edge 128, the end edge 130 and the bottom edge 132 of the valve body 112 are formed with the recesses 134, 136 and 138 respectively, extending the length thereof. Positioned in the recesses 134, 136 and 138 is a length of resilient material 140 such as sponge rubber or the like with the end portions 142 and 144 secured by compression between the upper edge of the valve body 112 and the shaft 114, FIG. 6 in particular. The resilient strip maintains sealing contact with the side walls 101 and 103 and the arcuate short wall 104. The valve member 110 is maintained in the closed position by means of a stop 146 secured to the short front wall 102 and engaged by the handle 120. When the handle 120 is lifted the valve body member 112 is moved to the short wall 102 thereby opening the discharge opening 108. With the handle 120 lowered to the stop 146 the discharge opening 108 is closed off in the position shown particularly in FIG. 7. The handle is held against the stop 146 as a result of the weight 122.

It will be seen that with the relatively wide valve body 112 and the arcuate rear wall 104 that food is easily and positively dispensed, and the valve mechanisms easily and effectively cleaned.

To maintain a seal between the shaft 114 and the short wall 102 a resilient elongated pad 148 is provided which is secured to the wall 102 and is in pressing engagement with the shaft. The resilient strips 140 and 148 prevent leakage around the valve body 112.

Each of the compartments 78, 80 and 82 is formed with an access opening 150 in the top thereof which is provided with a tight fitting closure member 152. The compartments are heated by the elements 20 and 46 which are wired to the conventional contact "on" and "off" thermostatic control T mounted in the recess door 22. The control T is connected to a source of power not shown.

Having thus described the invention, what is claimed as new and desired to be secured by Letters Patent is:

1. A device for storing and dispensing hot foods comprising:
   (a) a housing including side walls, a bottom wall and an enclosing top,
   (b) said housing having transverse internal walls forming a plurality of storage compartments in said housing,
   (c) heating means mounted within said side walls of said housing for warming said compartments,
   (d) the bottom wall of each of said compartments having a hopper connected to the lower end thereof,
   (e) valve means mounted on the lower end of each hopper,
   (f) means for actuating said valve means to dispense food from the compartment,
   (g) means on said top for gaining access to each of said compartments,
   (h) said valve means including side walls depending from said hopper,
   (i) a front wall connected to said side walls,
   (j) an arcuate rear wall connected to said side walls with the lower edge of said front wall thereby forming a discharge opening,
   (k) a flat valve closure member pivotally connected at its upper edge to said valve side walls with the lower and side edges in sealing contact with said arcuate rear wall and said side walls, respectively, to close off said opening, and
   (l) means for pivoting said closure member out of contact with said rear wall to a point adjacent said front wall whereby said hopper communicates with said discharge opening.

2. A device for storing and dispensing hot foods comprising:
   (a) a housing including side walls, a bottom wall and an enclosing top,
   (b) said housing having transverse internal walls forming a plurality of storage compartments in said housing,
   (c) heating means mounted within said side walls of said housing for warming said compartments,
   (d) the bottom wall of each of said compartments having a hopper connected to the lower end thereof,
   (e) valve means mounted on the lower end of each hopper,
   (f) means for actuating said valve means to dispense food from the compartment,
   (g) means on said top for gaining access to each of said compartments,
   (h) said valve means including side walls depending from said hopper,
   (i) a front wall connected to said side walls,
   (j) an arcuate rear wall connected to said side walls with the lower edge of said front wall thereby forming a discharge opening,
   (k) a flat valve closure member pivotally connected at its upper edge to said valve side walls with the lower and side edges in sealing contact with said arcuate rear wall and said side walls, respectively, to close off said opening, and
   (l) means for pivoting said closure member out of contact with said rear wall to a point adjacent said front wall whereby said hopper communicates with said discharge opening,
   (m) said pivoting means including a handle connected to said flat valve closure member,
   (n) said handle having a weight carried thereon urging said flat valve closure member to a point inwardly of said discharge opening to prevent food from moving out of said hopper,
   (o) stop means for maintaining said valve closure member at said point inwardly of said discharge opening.

References Cited

UNITED STATES PATENTS

| | | | |
|---|---|---|---|
| 2,144,465 | 1/1939 | Selleck | 222—146 X |
| 2,110,518 | 3/1938 | Becker | 222—556 X |
| 2,644,614 | 7/1953 | Tanko et al. | |
| 3,197,076 | 7/1965 | Chamblee. | |
| 3,270,918 | 9/1966 | Goodrich et al. | |

STANLEY H. TOLLBERG, Primary Examiner

U.S. Cl. X.R.

222—556